United States Patent [19]
Clopton

[11] Patent Number: 5,328,020
[45] Date of Patent: Jul. 12, 1994

[54] CONVEYOR FRAME WITH REMOVABLE TRACKS

[75] Inventor: Robert T. Clopton, Magnolia, Ky.
[73] Assignee: Tekno, Inc., Cave City, Ky.
[21] Appl. No.: 108,326
[22] Filed: Aug. 18, 1993

Related U.S. Application Data

[63] Continuation-in-part of Ser. No. 968,584, Oct. 29, 1992.
[51] Int. Cl.⁵ .......................................... B65G 17/24
[52] U.S. Cl. .................................. 198/779; 198/841; 198/861.1
[58] Field of Search ............... 198/779, 841, 836.1, 198/860.1, 860.2, 861.1

[56] References Cited

U.S. PATENT DOCUMENTS

| | | | |
|---|---|---|---|
| 3,964,800 | 6/1976 | Grimes et al. | 198/841 |
| 4,501,353 | 2/1985 | Burkhardt | 198/779 |
| 4,511,031 | 4/1985 | Lachonius | 198/836.1 |
| 4,742,905 | 5/1988 | Beers | 198/779 |
| 4,930,623 | 6/1990 | Johnson et al. | 198/465.1 |
| 4,951,809 | 8/1990 | Boothe et al. | 198/841 |
| 4,961,492 | 10/1990 | Wiseman et al. | 198/841 |
| 4,993,541 | 2/1991 | Roh | 198/781 |
| 5,029,697 | 7/1991 | McMillan et al. | 198/860.2 |
| 5,137,145 | 8/1992 | Clopton | 198/860.2 |
| 5,186,314 | 2/1993 | Clopton | 198/860.2 |

FOREIGN PATENT DOCUMENTS

| | | | |
|---|---|---|---|
| 64-13323 | 1/1989 | Japan. | |
| 8901915 | 7/1989 | Netherlands | 198/860.1 |

Primary Examiner—James R. Bidwell
Attorney, Agent, or Firm—Camoriano & Smith

[57] ABSTRACT

A conveyor frame includes removable rails for supporting a roller chain.

8 Claims, 3 Drawing Sheets

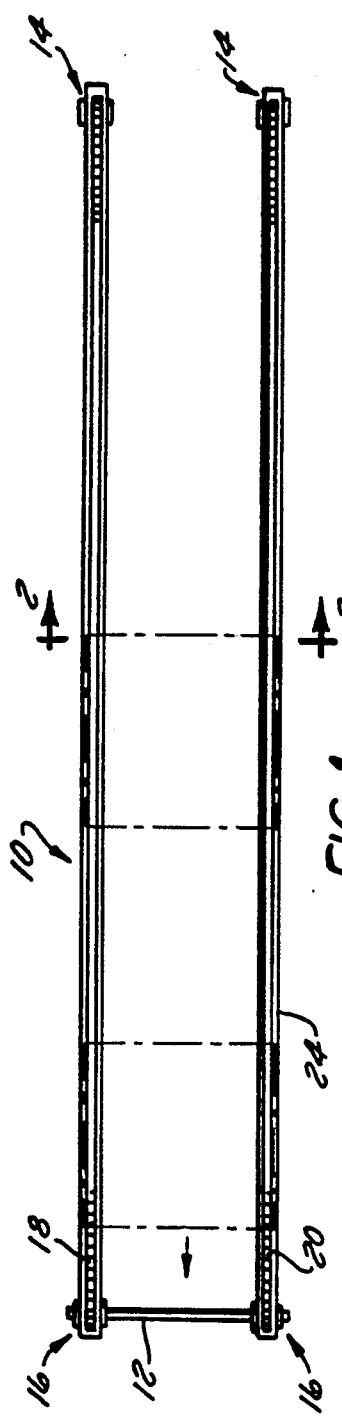
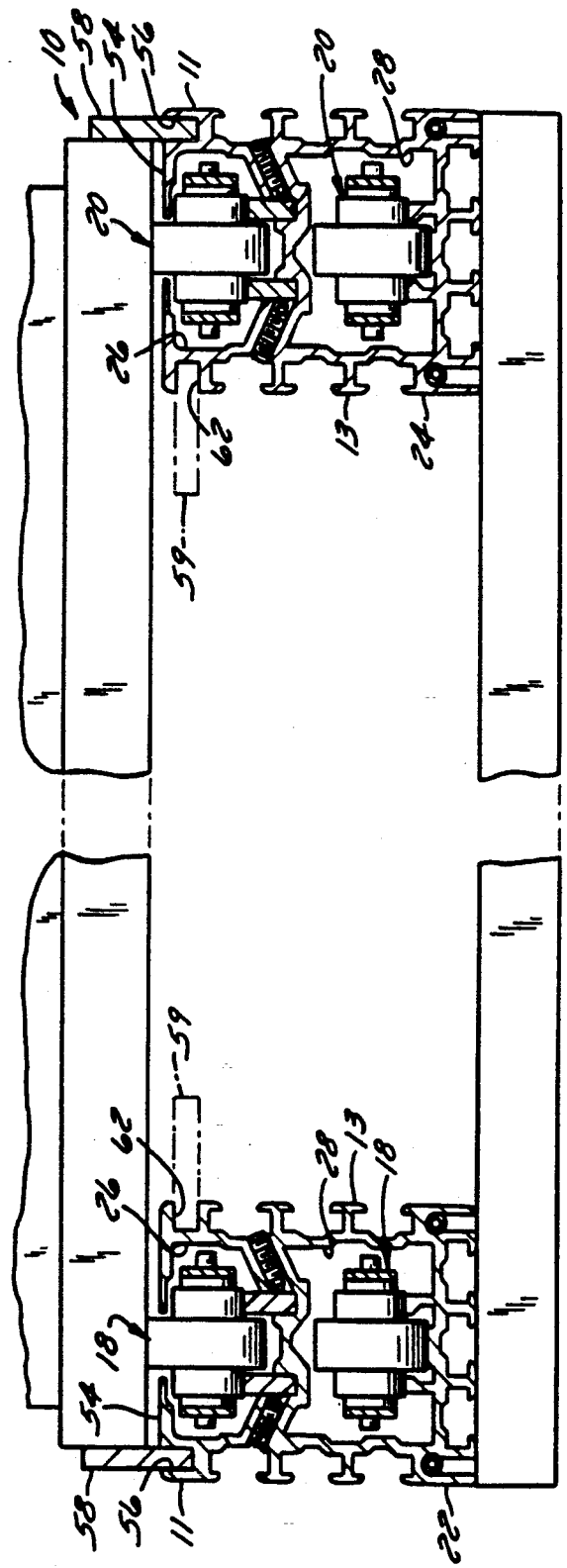

CONVEYOR FRAME WITH REMOVABLE TRACKS

BACKGROUND OF THE INVENTION

This application is a continuation-in-part of U.S. patent application Ser. No. 07/968,584, filed Oct. 29, 1992, which is hereby incorporated by reference. The present invention relates to conveyors, and, in particular, to conveyors which utilize a roller chain for carrying the articles to be conveyed.

It is known to use roller chains for conveying articles along a conveyor. In general, a frame is provided to support the chain, so the chain rolls on its rollers to carry a product. The frame includes a supporting surface or rail on which the rollers roll.

The problem that has been encountered is that, in some cases, it is desirable to be able to make the support surface or rail out of a different material from the frame. For example, it may be desirable to make the rails out of a harder material or a higher friction material, and to change from one material to another depending upon the products to be carried. It is possible to make removable rails which can be made out of any desired material. However, in the prior art, the removable rails had to have a special shape in order to be mounted on the conveyor frame, and the rails could only be installed or removed from the end of the conveyor frame, meaning that the frame had to be disassembled in order to change the rails. That meant that changing out worn rails or changing the material of the rails to set up the conveyor to carry a new type of product was very time consuming and expensive, both because it took a lot of labor to take the conveyor apart and change the rails and because the conveyor was shut down and unable to function during that whole time, thereby shutting down a warehouse or a production facility during that entire period of time.

SUMMARY OF THE INVENTION

The present invention provides a frame with removable rails that are made out of plain bar stock, requiring no specially-formed rails.

The present invention also provides removable rails which can be removed from the top of the frame, meaning that the frame does not have to be disassembled in order to remove and replace the rails. This saves labor and means that the rails can be changed out very quickly, avoiding expensive shut-downs of the conveyor.

BRIEF DESCRIPTION OF THE DRAWINGS

FIG. 1 is a top view of a conveyor made in accordance with the present invention, including two conveyor frame portions and two roller chains;

FIG. 2 is a view taken along the section 2—2 of FIG. 1;

DESCRIPTION OF THE PREFERRED EMBODIMENTS

Figure 3:
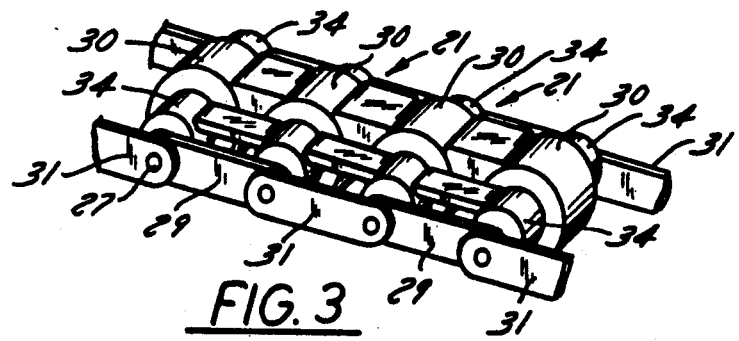
FIG. 3 is a perspective view of one of the roller chains used in FIG. 1.

The conveyor 10 of the present invention, as shown in the figures described above, includes a drive shaft 12, which connects together two parallel sets of drive sprockets 16. At the other end of the conveyor, are two parallel sets of idler sprockets 14. The drive sprockets 16 on the left side of the conveyor are used to drive a left chain 18, and the drive sprockets 16 on the right side of the conveyor are used to drive a right chain 20.

The left and right chains 18, 20 run parallel to each other in parallel left and right frame portions 22, 24, respectively. The left and right frame portions are preferably modular extruded parts which can be fastened together to make the conveyor 10 any desired size. These modular extruded parts 22, 24 have an exterior side 11 and an interior side 13 and define an upper chamber 26, which receives the upper run of the chain 18 or 20, and a lower chamber 28, which receives the lower run of the chain.

The chains 18, 20 shown in this preferred embodiment of the invention are made up of a plurality of links 21, with each link 21 made up of a forward large roller 30 flanked by two smaller rollers 34 connected together by a chain pin 27, a rear large roller 30 flanked by two smaller rollers 34 connected together by a chain pin 27, and a pair of inner side bars 29 connected to said forward rollers and rear rollers by means of the chain pins 27. The forward set of rollers 30, 34 and rear set of rollers 30, 34 form the front and back ends of a rectangle, and the sides of the rectangle are formed by the inner side bars 29. The links 21 are connected together by outer side bars 31, which are fastened to the rear of one link and the front of the next adjacent link by means of the chain pins 27.

The lower chambers 28 of both frame portions 22, 24 are completely enclosed on the top, bottom, left and right sides. The upper chambers 26 are enclosed on the left and right sides and on the bottom, and are partially enclosed on the top, defining a top opening 25, with only the large central roller 30 of the chain 18, 20 projecting through the top opening 25 and above the top surface of the frame portions 22, 24 for contacting the pallet or other article to be conveyed. The lower chambers 28 provide integral, extruded raised rails 32 for supporting the smaller-sized rollers 34 in rolling engagement on the return run. The upper chambers 26 provide removable rails 33, which fit into elongated, top-opening slots 36 for supporting the smaller-sized rollers 34 on the forward, conveying run.

Figure 5:
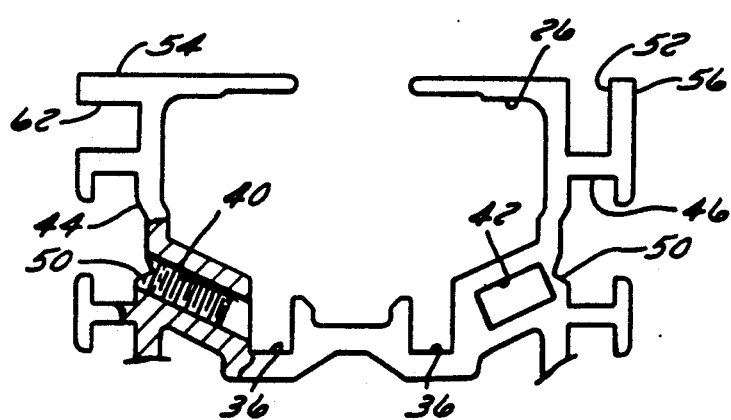
FIG. 5 is a view of the top portion of FIG. 4, partially in section, before the right retaining screw hole has been drilled out and before the rails have been installed.
Figure 6:
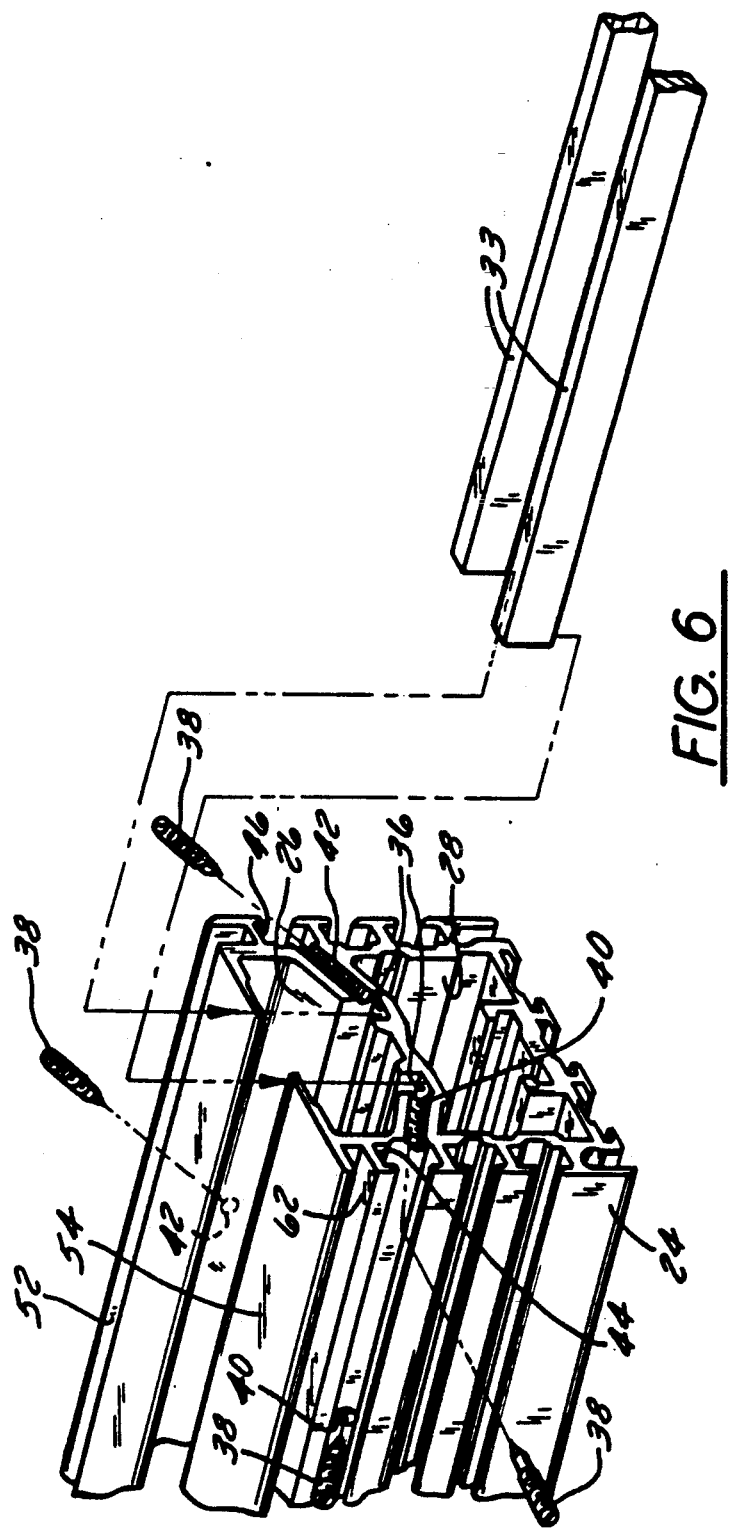
FIG. 6 is a perspective view of the frame of FIG. 4 with the rails removed.

The removable rails 33 are made from off-the-shelf, rectangular cross-section bar stock. The top-opening slots 36 are also generally rectangular-shaped. Set screws 38 are installed at intervals along the conveyor frame at an angle to push the bar stock inwardly and downwardly in order to retain the bar stock rails in place. In order to facilitate the installation of the set screws 38, left and right inclined, elongated pockets 40, 42 are extruded in the conveyor frame inside their respective left and right T-slots 44, 46. FIG. 5 shows the right pocket 42 before it has been drilled out for the set screw 38, and it shows the left pocket 40 after it has been drilled and tapped for the installation of a set screw 38. The pockets 40, 42 lie between their respective T-slots 44, 46 and their respective rail-receiving slots 36, and there are webs of material separating the pockets 40, 42 from their respective T-slots and rail-receiving slots.

The left and right set screw pockets 40, 42 run the length of the frame and have a smaller width than the diameter of the set screws 38. It is necessary, at intervals along the conveyor frame, to drill through the webs of material separating the pockets from their respective slots and to tap the holes to form threads to receive the set screws 38. The purpose of the set screw pockets is to reduce the amount of material that has to be removed by drilling (in order to speed up the installation) and to provide a pilot so that the angle and direction of the drilled hole will be correct.

As can be seen on the right side of FIG. 5, the T-slot 46 is formed with an indicator notch 50, which indicates where to begin drilling the hole. Once the holes have been drilled and tapped and the set screws 38 installed, the removable rails 33 are secured in the conveyor frames, with the set screws pushing the rails inwardly and downwardly.

To remove the removable rails 33, the set screws are removed, the chain 18 or 20 is removed from the upper run of the conveyor, and the removable rails 33 can then be lifted up out of the top opening of the conveyor frame, without disassembling the conveyor frame. New removable rails 33 can be inserted down through the top opening of the conveyor frame, inserted into their respective top-opening rail slots 36, and then the set screws 38 can be inserted again, to hold the new rails 33 in place.

As can be seen from the drawings, the left and right frame portions 22, 24 are mirror images of each other. To achieve the mirror images, identical extrusions are simply run in opposite directions.

Figure 4:
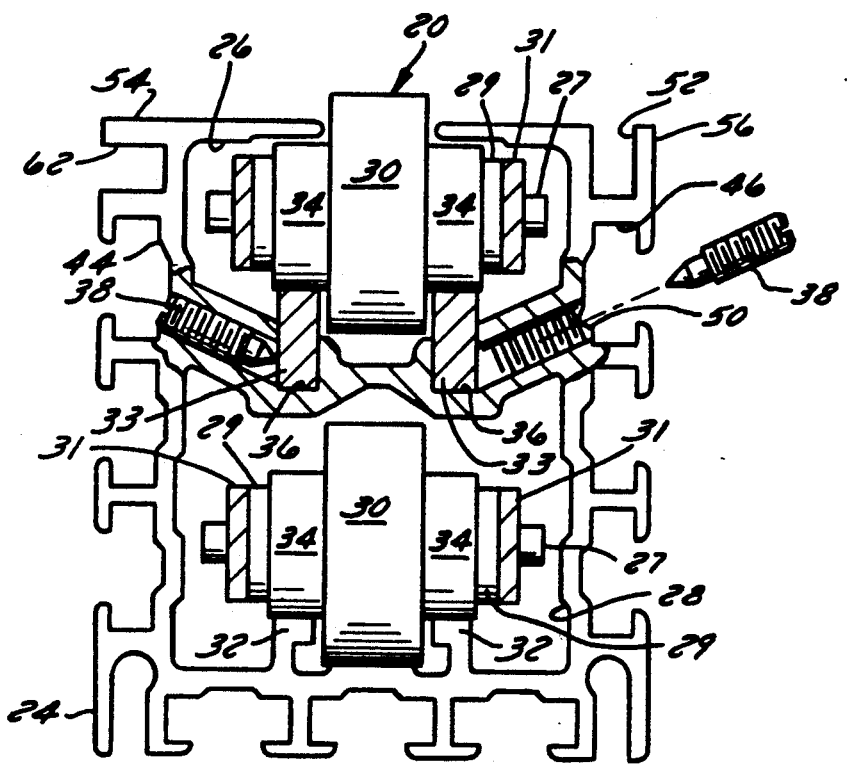
FIG. 4 is an enlarged view of the right frame portion of FIG. 2, partially in section, with one of the rail retaining screws removed.

As is shown in FIGS. 2 and 4, the frame members 22, 24 define a rectangular vertical slot 52 opening outwardly from their upper surface 54 adjacent their outside edge 56. The vertical slots 52 are taller than they are wide and are used to support guide rails 58. The height of the vertical slots is preferably at least two times the width. The width of the vertical slots 52, and the width of the rail-receiving slots 36 are preferably some standard size, such as ¼", or ⅜" so that the slots can accept a standard, off-the-shelf piece of bar stock.

Unlike prior art designs, in which the guide rails must be specially made to bolt to the conveyor frame, these vertical slots can receive any available bar stock. For example, a ¼"-wide guide slot might receive a ¼" bar made of ultra high molecular weight polyethylene or steel. In this manner, guide rails 58 and chain support rails 33 are simple and inexpensive, and the guide rails can be placed in any location or locations along the conveyor as needed. In order to secure the guide rail 58 on the frame, holes (not shown) may be drilled through the frame and screws (not shown) inserted through the holes and into the bar stock, or other known fastening means may be used. These screws or other fastening means are inserted at regular intervals along the length of the guide rail, such as at 18-inch intervals. The vertical guide rail slots 52 are continued into the housing 60 for the drive sprockets 16 and into the identical housing 60 for the idler sprockets 14, so that the guide rails 58 may extend along the housings 60 as well, providing a continuous guide surface along the entire length of the conveyor. The top-opening slots 36 for receiving the support rails 33 and the set-screw-receiving pockets 40, 42 may also be extended into the housings 60 if desired.

Each frame portion 22, 24 also has a horizontal guide slot 62 defined in the inwardly-facing side of the frame portion 22, 24 adjacent to the upper surface 54. These horizontal guide slots 62 are rectangular and are at least as wide as they are tall. These slots 62 are adapted to receive standard bar stock 59, which serves as an inexpensive horizontal guide surface (shown in phantom in FIG. 2) for guiding along a downwardly projecting cam roller on the underside of a pallet (not shown). Again, the guide material is fastened to the frame with screws or other known fastening means at regular intervals (not shown).

It will be obvious to those skilled in the art that modifications may be made to the embodiment described above without departing from the scope of the present invention.

What is claimed is:

1. A conveyor frame for a chain-driven conveyor, comprising:
   an elongated frame member having an exterior side and an interior side and defining elongated upper and lower chambers, said upper chamber defining a top opening and defining a pair of parallel, upwardly-opening, rail-receiving slots lying in said upper chamber below said top opening;
   a pair of elongated rail members having a substantially rectangular cross-section, said rail members being received in said respective upwardly-opening slots and projecting upwardly out of said slots, said rail members being adapted to serve as a support surface for the rollers of a roller chain;
   wherein said rail members can be installed on said elongated frame member and removed from said elongated frame member by lifting them up out of said rail-receiving slots and passing them through said top opening.

2. A frame as recited in claim 1, and further comprising:
   a pair of inclined, elongated pockets extending adjacent to said pair of upwardly-opening slots, said inclined, elongated pockets being adapted to serve as pilots for directing retaining screws, such that retaining screws extending through said inclined, elongated pockets would contact their respective rail members and push downwardly and inwardly on their respective rail members.

3. A frame as recited in claim 2, and further comprising a plurality of retaining screws, said retaining screws extending down through said elongated pockets at intervals along said pockets and contacting their respective rails so as to secure said rails on said frame.

4. A frame as recited in claim 2, wherein said frame members define T-slots in their outer surface and wherein said elongated pockets lie between a T-slot and a rail-retaining slot.

5. A frame as recited in claim 2, wherein there are webs of material between said elongated pockets and the outside of said conveyor frame and between said elongated pockets and their respective rail-retaining slots, and wherein the outside of said conveyor frame defines an indicator notch which indicates where to drill through the web in order to reach the pocket.

6. A conveyor frame as recited in claim 1, wherein said top surface defines a vertical guide slot adjacent to the exterior side of said frame adapted to receive a rectangular piece of bar stock to serve as a guide.

7. A conveyor frame as recited in claim 6, wherein said interior side defines a horizontal guide slot adjacent to the top surface adapted to receive a rectangular piece of bar stock to serve as a guide.

8. A conveyor frame for a chain-driven conveyor, comprising:

- an elongated frame member having an exterior side and an interior side and defining elongated upper and lower chambers, said upper chamber defining a top opening and defining a pair of parallel, upwardly-opening, rail-receiving slots lying in said upper chamber below said top opening;
- a pair of elongated support rails having a substantially rectangular cross-section, said support rails being received in said respective rail-receiving slots and projecting upwardly out of said slots, said rails being adapted to serve as a support surface for the rollers of a roller chain;
- wherein said rails can be installed on said elongated frame member and removed from said elongated frame member by lifting them up out of said rail-receiving slots and passing them through said top opening;
- a pair of inclined, elongated pockets extending adjacent to said pair of rail-receiving slots, said inclined, elongated pockets being adapted to serve as pilots for directing retaining screws, such that retaining screws extending through said inclined, elongated pockets would contact their respective rail members and push downwardly and inwardly on their respective rail members;
- said top surface defining a vertical guide slot adjacent to the exterior side of said frame adapted to receive a rectangular cross-section piece of bar stock to serve as a guide; and
- said interior side defining a horizontal guide slot adjacent to the top surface adapted to receive a rectangular cross-section piece of bar stock to serve as a guide.

* * * * *